United States Patent [19]

Jung

[11] Patent Number: 5,751,545
[45] Date of Patent: May 12, 1998

[54] DESKTOP PERSONAL COMPUTER WITH AN EASY ASSEMBLY STRUCTURE

[75] Inventor: Hee-Duck Jung, Suwon-si, Rep. of Korea

[73] Assignee: SamSung Electronics Co., Ltd., Suwon, Rep. of Korea

[21] Appl. No.: 730,901

[22] Filed: Oct. 18, 1996

[30] Foreign Application Priority Data

Jan. 17, 1996 [KR] Rep. of Korea ............... 819/1996

[51] Int. Cl.⁶ ..................... G06F 1/16; H05K 5/03
[52] U.S. Cl. ............... 361/683; 361/725; 312/223.2; 292/207
[58] Field of Search ............... 361/683, 684, 361/685, 686, 724–727; 312/263, 265.5, 257.1, 223.1, 223.2; 292/207, 202, DIG. 11

[56] References Cited

U.S. PATENT DOCUMENTS

| | | | |
|---|---|---|---|
| 4,909,579 | 3/1990 | Liu | 312/208 |
| 4,978,949 | 12/1990 | Herron et al. | |
| 5,030,128 | 7/1991 | Herron et al. | |
| 5,051,868 | 9/1991 | Leverault et al. | 361/683 |
| 5,114,194 | 5/1992 | Toifl et al. | 292/106 |
| 5,162,976 | 11/1992 | Moore et al. | 361/683 |
| 5,196,993 | 3/1993 | Herron et al. | |
| 5,423,605 | 6/1995 | Liu | |
| 5,446,618 | 8/1995 | Tetsuya et al. | 361/683 |
| 5,465,191 | 11/1995 | Nomura et al. | |
| 5,593,220 | 1/1997 | Seid et al. | 312/265.6 |

*Primary Examiner*—Leo P. Picard
*Assistant Examiner*—Lynn D. Feild
*Attorney, Agent, or Firm*—Robert E. Bushnell, Esq.

[57] ABSTRACT

A chassis of a desktop personal computer where the cover can easily be assembled onto or removed from the base by a user without the use of screws or tools. This allows the user to gain easy access to the electrical components inside the chassis. The design of the base and the cover incorporates a set of guide pins to be inserted into a corresponding set of guide holes in order to properly position the cover onto the base. Then, the cover is fastened to the base by rotating a buckle pivotally attached to the cover to the base so that it engages the base. Finally, a slidable detent located on the cover can be slid onto the buckle, preventing the buckle from inadvertently becoming unfastened. To disassemble the cover from the base, the process is simply reversed. First, the detent is slid of the buckle, allowing the buckle to rotate. Next, the buckle is disengaged from the base by pivoting it open. Finally, the cover is removed from the base by sliding the cover off the base while extracting the guide pins from the guide pin holes.

20 Claims, 3 Drawing Sheets

DESKTOP PERSONAL COMPUTER WITH AN EASY ASSEMBLY STRUCTURE

CROSS-REFERENCE TO RELATED APPLICATIONS

This application makes reference to, incorporates the same herein, and claims all benefits accruing under 35 U. S. C. §119 arising from an application for A Desktop Personal Computer With An Easy Assembly Structure earlier filed in the Korean Industrial Property Office on the 17th of January, 1996 and there duly assigned Ser. No. 819/1996.

FIELD OF THE INVENTION

The present invention relates generally to desktop personal computers, and more particularly, to the structure of cases serving as housings for desktop personal computers.

BACKGROUND OF THE INVENTION

Conventional designs of desktop personal computer cases provide a product that it is difficult to efficiently and quickly open, and that requires the manufacturer or the operator to unfasten and then reinstall the screws in the computer case using one or more hand tools. Latches have not been used in computer cases because of the availability of a less expensive alternatives, such as using screws. In the past, it was generally a service technician, rather than an operator, that opened computer cases. As a service technician would work on many different configurations of computer cases in a single day, the service technician was equipped with the numerous hand tools required to remove the different types of threaded fasteners in order to open and close a computer case and to fix the equipment. Today, it has been more common for an operator to be required to open and close a computer case. Since an operator opens a computer case only occasionally, it is much more unlikely that the operator will possess the correct hand tools necessary to remove and reinstall the threaded fasteners to accomplish this task.

The art has recently began to use latches for opening and closing a computer chassis. For example, U.S. Pat. Nos. 4,978,949 for a Locking Mechanism and Support Legs For Removable Display Assembly, U.S. Pat. No. 5,030,128 for a Docking Module, and U.S. Pat. No. 5,196,993 for a Removable Stand Alone Display For Laptop Computer to Herron et al. each disclose a lap-top computer where the major components can be separated from each other by use of a lever, U.S. Pat. No. 5,423,605 for a Front Panel Structure For A Personal Computer to Liu shows a personal computer where the front panel can be attached to and detached from the computer casing, allowing the user to have access to the interior of the personal computer. The user detaches the front panel from the computer case by inserting his fingers into notches to bend a flexible strip, which allows hooks to rotate out of engagement with lower openings in the case 2. Then, the user may then rotate the bottom flange of front panel away from the casing, thus completing the detachment.

More recent designs include U.S. Pat. No. 5,465,191 to Nomura et al. for a Single Hand Operable Latch Mechanism For Hinged Container, which shows a spring load hand operating latch mechanism for a hinged container such as a lap-top computer. A pair of latches are connected to a pair of slider that are biased to the locked or the engaged position. These slides, although movable, are inseparable from the cover of the unit. The user slide both sliders simultaneously in a direction opposite to the bias of the spring. This causes a latch or hook to disengage itself from the base of the apparatus so that the user can lift the front of the cover off the base. A pair of hinges near the rear prevent the cover from being completely separated from the base, but allow the user to pivot the front of the cover up above the rear of the base.

I have found that the combination of these latches with hinges hinders access other interior of the computer because the cover remains attached by the hinge to the chassis, while the use of more than one latch unnecessarily requires especially precise alignment between the cover and chassis of the housing.

SUMMARY OF THE INVENTION

Accordingly, it is an object to provide an improved housing of a personal computer.

It is another object to provide a different design for a personal computer that facilitates removal and reinstallation of the cover of the chassis on the base of the chassis, allowing the user to have easy access to the electrical components inside the personal computer.

It is yet another object to provide a mechanism preventing the inadvertent opening of the chassis of a personal computer.

To achieve these and other objects, there is provided a desktop personal computer with an easy assembly structure contains a base portion of a chassis of a computer case for mounting internal circuits as well as a power source, a cover of the computer case, when assembled to the base, completely encloses the internal circuits of the personal computer, a buckle mounted on a rear portion on the top side of the cover to fasten the upper cover of the computers case and the base portion of the chassis, a groove positioned in the top portion of the rear panel of the base portion to allow the buckle to receive and securely, by camming action, the cover to the base, a sliding detent knob for preventing the inadvertent disengagement of the buckle from the groove in the base portion, a pair of guide pins integrally formed on the cover, and a corresponding pair of guide holes positioned in the rear panel of the bottom portion of the computer for positioning the cover unit in proper alignment onto the base unit prior to securing the buckle to the buckle groove.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
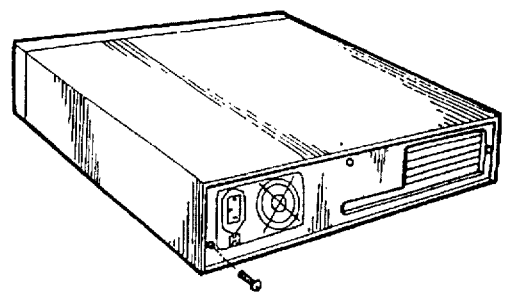
FIG. 1 is a perspective view illustrating a hypothetical conventional desktop personal computer case.

Turning now to the drawings, FIG. 1 is a perspective view illustrating the conventional desktop personal computer case. Referring to FIG. 1, the conventional desktop personal computer case is assembled or disassembled by screws. When a manufacturer or an operator wants to open or close the computer case housing a, the manufacturer or the operator must screw or unscrew the screws in the computer case using appropriate hand tools.

Figure 2:
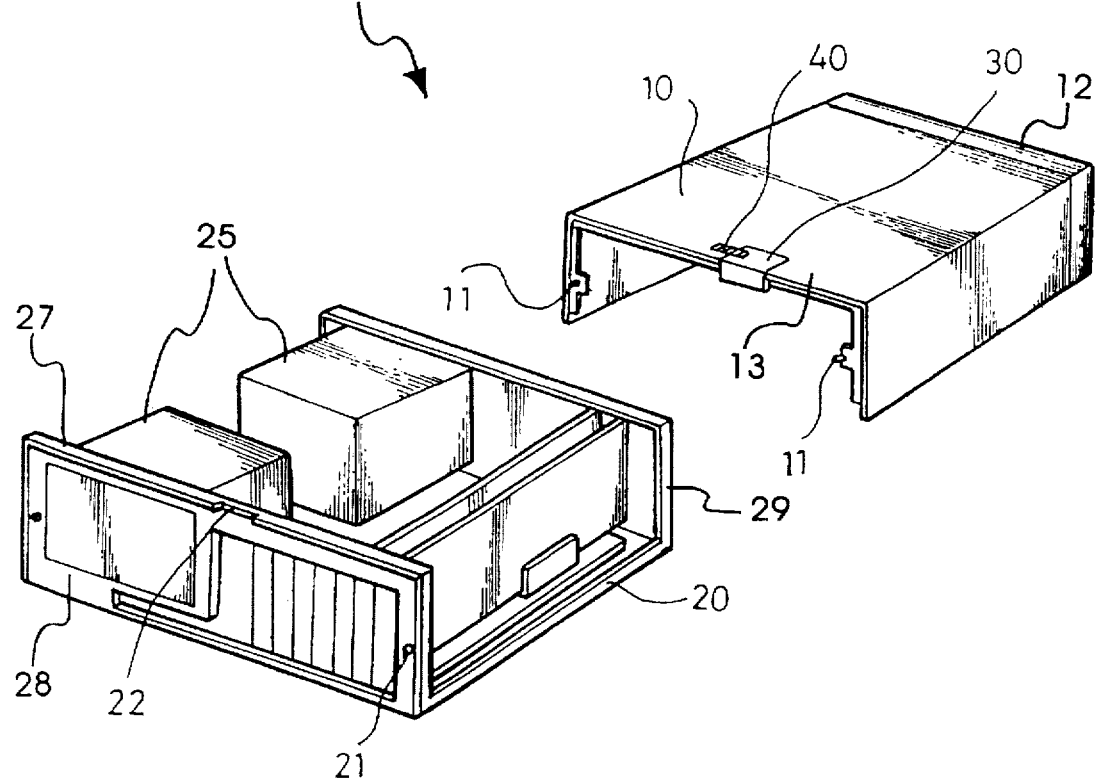
FIG. 2 is an exploded perspective view illustrating the assembly of a case housing a desktop personal computer constructed according to the principles of the present invention.

In the present invention, the user need not resort to using screws or tools when opening or closing a computer case. Referring to FIG. 2, the desktop personal computer case assembly according to the preferred embodiment of the present invention includes a chassis 200 made up of a cover 10 and a base unit 20. Base unit 20 includes a front panel 29 and a rear panel 28 integrally formed thereto. When cover 10 is properly fitted onto base 20, electrical components 25 are completely enclosed and protected from external interference. Cover 10 can be properly fitted onto base 20 by inserting guide pins 11, extending from the rear portion of cover 10, into the corresponding guide holes 21, perforating the rear panel 28 of base unit 20.

Also shown in FIG. 2 is a perspective view of the fastening mechanism that fastens a properly fitted cover 10 to base unit 20. This fastening mechanism includes buckle 30 integrally formed at the rear portion 13 of cover 10, and catching groove 22, shown to be positioned in operational relationship with buckle 30, groove 22 is positioned on flange 27 of rear panel 28 of base unit 20. Finally, FIG. 2 shows a locking or detent mechanism 40 which locks buckle 30 into an engaged position with groove 22. Detent 40 serves to prevent the inadvertent unfastening of buckle 30.

Figure 3:
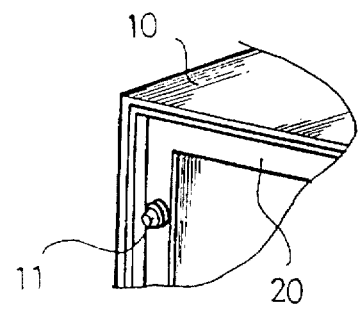
FIG. 3 is a fragmentary rear view illustrating a desktop personal computer case assembly constructed according to the principles of the present invention.
Figure 4:
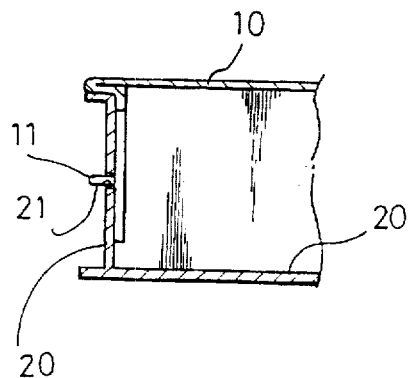
FIG. 4 is a sectional view illustrating a rear portion of a desktop personal computer case assembly constructed according to the principles of the present invention.

FIGS. 3 and 4 are close up views which focus on the mechanism used to fit cover 10 onto base unit 20. The fitting is accomplished by inserting corresponding guide pins 11 into corresponding guide pin holes 21 formed at the rear of the device.

Figure 5:
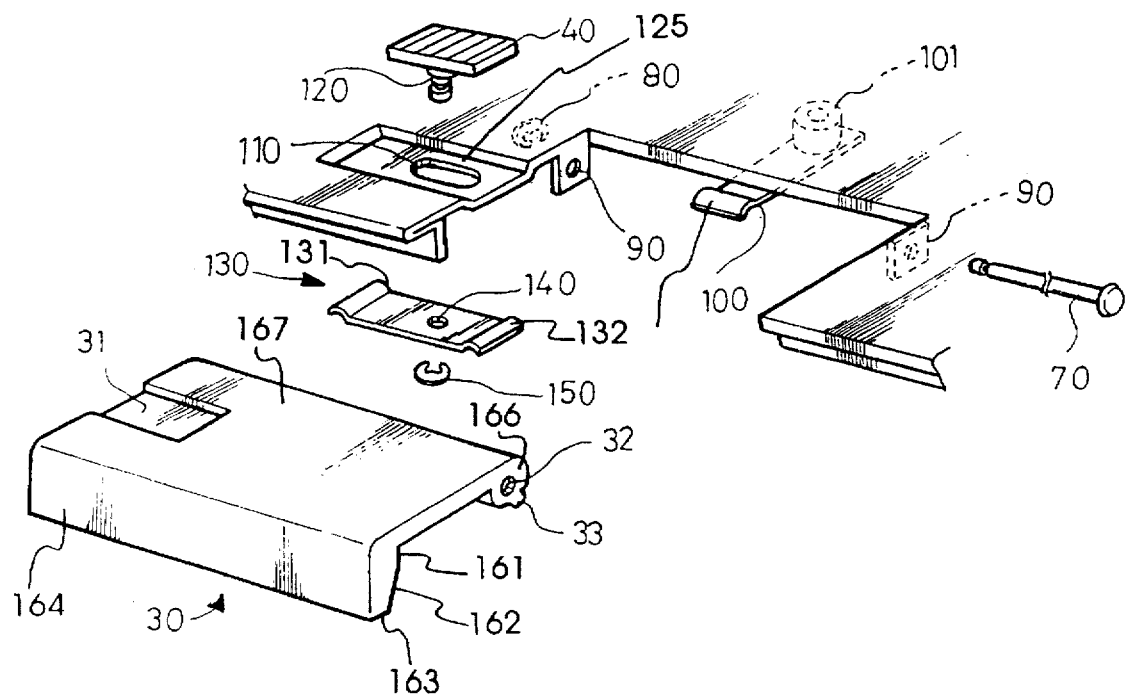
FIG. 5 is an exploded perspective view illustrating a locking device of a desktop personal computer case assembly constructed according to the principles of the present invention.
Figure 6:
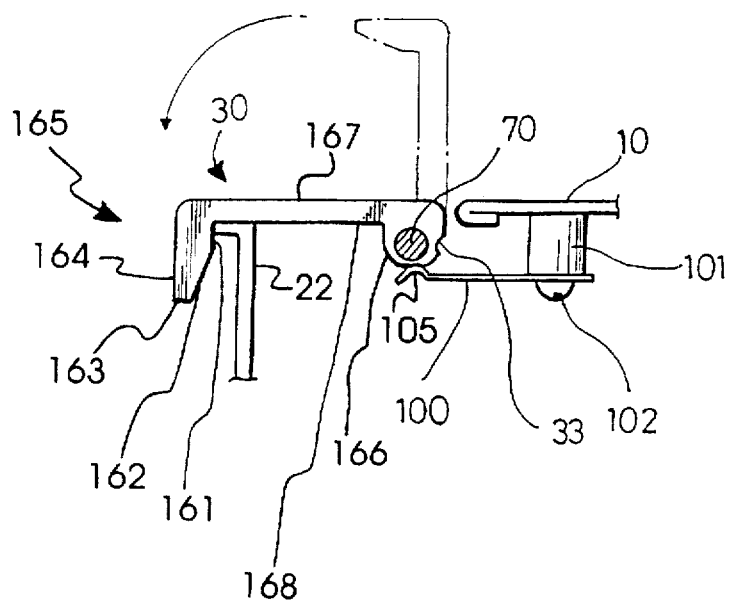
FIG. 6 is a view illustrating a buckle attached to a desktop personal computer case assembly according to the principles of the present invention.
Figure 7:
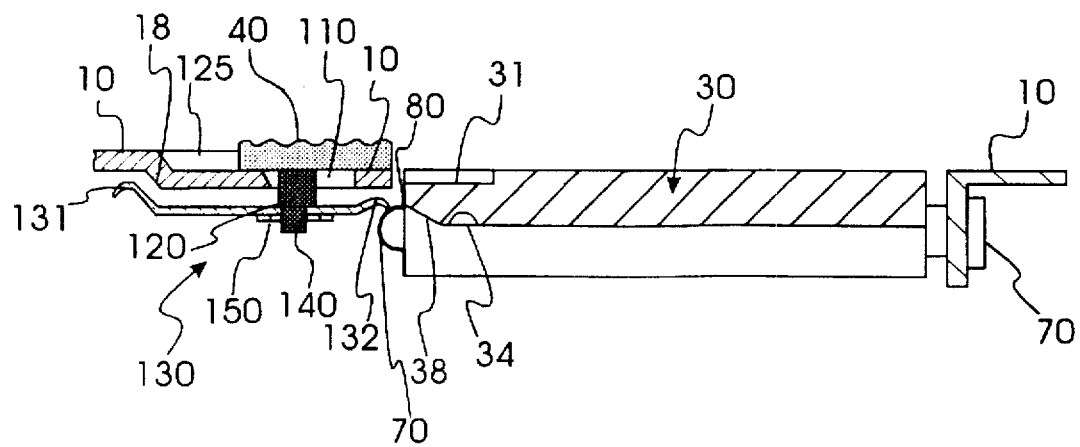
FIG. 7 is a cross sectional view of the buckle and the detent as seen from the rear FIGS. 2 and 5, looking into the computer case.

FIGS. 5 through 7 show a more close up and detailed view of the fastening and detent mechanisms used in this invention. Fastening buckle 30 is shown to be pivotally connected to the rear portion 13 of cover 10. Connecting pin 70 extends through supporting holes 90 of cover 10 and through connecting pin hole 32 of shank 166 of buckle 30, pivotally attaching buckle 30 to cover 10. Stop ring 80 prevents connecting pin 70 from becoming detached from buckle 30 or cover 10. Buckle 30 is allowed to rotate between an engaged position as shown by the solid lines in FIG. 6, and a disengaged position as shown by the phantom lines in FIG. 6. Shank 166 of buckle 30 contains shank groove 33 that extends the length of shank 166. First spring plate 100, having one knuckle 105, is fixedly attached to cover 10 by connecting screw 102 and supporter 101. When cover 30 is rotated to the disengaged position, shank groove 33 mates with knuckle 105 of first spring plate 100. If an external force is then applied, cover 30 can rotate out of this disengaged position in the direction of the arrow in FIG. 6 to the engaged position as shown by the solid lines in FIG. 6. While rotating between the disengaged and the engaged position, shank 166 cams with knuckle 105 of first spring plate 100.

Buckle 30 fastens cover 10 to base unit 20 by rotating cover 30 to the engaged position to engage with groove 22. At the outermost radial extremity of cover 30 is lip 165, which extends from bottom surface 168 of buckle 30. Furthest from shank 166, lip 165 contains a rear face 164 having a flat surface. Closest to shank 166 and adjacent to bottom surface 168 is indentation 161, which is in contact with groove 22 when buckle 30 is in its engaged position. At the end of lip 165, furthest from bottom surface 168, is tip surface 163, whose surface is parallel to bottom surface 168 of buckle 30. Finally, between tip surface 163 and indentation 161 is camming surface 162, a flat surface that forms an obtuse angle to tip surface 163. As buckle 30 rotates to the engaged position, camming surface 162 of buckle 30 cams with groove 22 of flange 27 of rear panel 28 of base portion 20, causing rear panel 28 to deform and pull in towards front panel 29. This camming action, together with the indentation, allows buckle 30 to fasten cover 10 to base unit 20. When buckle 30 is in the engaged position, top surface 167 is flush with the top surface of cover 10.

FIGS. 5 through 7 show a locking or detent feature which prevents buckle 30 from popping out of its engaged position inadvertently. The detent feature contains a sliding detent 40 that is positioned on the top side of cover 10 in detent recess 125 built into cover 10. Detent recess 125 is positioned to the left of buckle 30 in FIGS. 5 and 7 such that when buckle 30 is in its engaged position, detent groove 31 formed on top surface 167 of buckle 30 is lined up with and is flush with detent recess 125 of cover 10. Sliding detent 40 is connected to the center of second spring plate 130 via supporting shaft 120 that extends through guide hole 110 in detent recess 125 in cover 10 and through hole 140 in second plate spring 130 and through stop ring 150. Second plate spring 130 contains knuckles at both its first end 131 and its second end 132.

Sliding detent 40 can slide between an unlocked position and a locked position. When in an unlocked position, sliding detent is confined entirely within detent recess 125 in cover 10 as shown in FIG. 7. When cover 30 is in its engaged position, sliding detent 40 may be slid into its locked position. This is accomplished by sliding detent 40 as shown in FIGS. 5 and 7 to the right so that a portion of sliding detent 40 occupies detent groove 31 of buckle 30. As can be seen from FIG. 7, as sliding detent 40 is moved to its locked position to the right, second plate spring 130 also moves to the right. As this occurs, knuckle 132 on the second end of second spring plate 130 cams with sloped or ramped camming surface 38 of buckle 30. As sliding detent 40 continues to slide to the right, knuckle 132 fits into and mates with second groove 34 formed on the bottom side 168 of buckle 30. Thus, sliding detent 40 "clicks" into a locked position, preventing buckle 30 from accidentally or inadvertently rotating out of its engaged position.

To unlock buckle 30, sliding detent 40 of FIGS. 5 and 7 is slid to the left. As this occurs, sliding detent 40 vacates detent groove 31 formed on top surface 167 of buckle 30. As sliding detent 40 continues to be slid to the left, knuckle 131 formed on the first end of second spring plate 130 catches or "clicks" behind catch 18 formed on cover 10 at the outer boundary of detent recess 125, causing sliding detent 40 to remain in an unlocked position.

If the user now wishes to gain access to the electrical components inside the chassis, the user is now free to lift or rotate buckle 30 from its engaged position shown by the solid lines in FIG. 6 to its disengaged position shown by the phantom lines in FIG. 6. Now, cover 10 is ready to be separated from base 20. If the user pulls forward the front 12 of cover 10 away from rear panel 28 of base 20, guide pins 11 will be removed from guide holes 21, allowing the user to gain access to electronic components 25 without the use of screws or special tools.

This disclosure has depicted only one possible embodiment of the present invention. Other obvious embodiments are also possible. These include having guide pins and guide holes on the front of the device, having buckles on the front of the device, having buckles on both the front and the back of the device, having guide pins and guide holes on both the front and the back of the device, and having multiple buckles on each side of the device. These obvious variations are to be considered within the spirit of the present invention.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A desktop personal computer case with an easy assembly structure, comprising:

a base of a computer case for containing internal circuits and a power source in a computer;

a cover of the computer case mountable on said base to protect the internal circuits and the power source of the computer;

a buckle mounted on a rear portion of said cover, for latching said cover to said base;

a groove positioned in the top rear portion of said base;

a detent mounted on the rear portion of said cover, for securing the buckle after the buckle latches said cover on to the groove of said base;

a guide pin attached to and extended outwardly from said cover for aligning said cover with said base unit, when said cover is mounted on said base; and said base unit having a guide hole formed in the rear portion to receive said guide pin, when said cover is mounted on said base.

2. A personal computer case with an easy assembly structure, comprising:

a base unit having a front panel and a back panel for containing a plurality of electronic components, said front and said back panel each having a top side, a bottom side, a left side, and a right side, said back panel having a flange along a top side, said base unit having electronic components mounted between said front panel and said back panel, each of said left side and said right side of said back panel perforated by at least one guide hole;

a cover unit conforming in shape to said base unit enclosing said electronic components, said cover unit having a front end and a back end, and at least one guide pin extending from said back end, said cover unit and said base unit enclosing said electronic components when said cover unit is mounted on said base unit and the guide pin of said cover unit is inserted into the corresponding guide hole of said base unit;

a buckle having a top side, an underside opposite said top side, a front side, a back side, a left side, and a right side, said buckle having a shank extending along one side of said buckle;

a pivot pin, attached to said cover unit, extending through said shank of said buckle, pivotally attaching said buckle to said cover unit, for allowing said buckle to rotate between an engaged position where said buckle is flush with said cover unit, and a disengaged position where said buckle extends obliquely from said cover unit; and a groove formed in said flange of said base unit, and positioned to engage with said buckle, when said cover unit is mounted on said base unit.

3. The personal computer case of claim 2, wherein said buckle cams with said first groove formed in said flange of said rear panel of said base unit when said buckle is pivotally rotated to said engaged position to eatingly engage said groove.

4. The personal computer of claim 3, wherein said back panel of said base unit deforms and pulls towards said front panel of said base unit when said buckle is pivotally rotated to said engaged position, fixing said cover unit to said base unit.

5. The personal computer of claim 2, further comprising a slidable detent for said buckle, said slidable detent positioned in a detent recess on said top side of said cover unit adjacent said left side of said buckle, said detent recess being flush with said detent groove of said buckle when said buckle is in said engaged position, said slidable detent being in slidable relation with said cover unit between an unlocked position and a locked position, said locked position occurring when said buckle is in said engaged position and said slidable detent is in said detent groove formed on said top side of said buckle, preventing said buckle from inadvertently becoming disengaged, said slidable detent is in said unlocked position when said slidable detent is slid away from said left edge of said buckle so that said detent is completely situated within said slidable detent recess on said top side of said cover unit.

6. The personal computer case of claim 5 further comprising:

a first plate spring positioned adjacent to and against said underneath surface of said cover unit, said first plate spring having a first end and a second end, said first end being fixedly attached to said underneath surface of said top cover, said second end forming a knuckle;

a second plate spring positioned adjacent to and against said underneath surface of said cover unit, said second plate spring having a first end, a second end, and a central portion between said first end and said second end, said second plate spring fixedly attached to said slidable detent at said center portion via a supporting shaft extending through a guide hole perforating said cover unit at said detent recess, said second plate having a knuckle formed at each end;

said shank of said buckle containing a shank groove extending parallel to said pivot pin, said shank of said buckle camming with said knuckle of said first plate spring, said shank groove mates with said knuckle of said first plate spring when said buckle is in said disengaged position, said buckle having a second groove formed on said underside near said left side of said buckle underneath said detent groove, said second groove accommodates said knuckle located at said second end of said second plate spring when said slidable detent is slid to said locked position.

7. The personal computer case of claim 6 wherein said underside of said buckle is comprised of a sloped camming surface disposed between said second groove and said left edge, allowing said knuckle on said second end of said second plate spring to cam with said underside of said buckle when said slidable detent is slid from said unlocked position to said locked position.

8. The computer case of claim 6, wherein said buckle further comprises a lip extending from said front side of said underside of said buckle, said lip comprising:

a front face having a flat surface, said front face located on said lip at a position furthest from said shank of said buckle;

a locking indentation surface at a location closest to said shank, said indentation surface adjacent to said under of said buckle;

a tip surface positioned on the end of said lip, said tip surface parallel to said under of said buckle; and a camming surface positioned between said tip surface and said indentation surface on said buckle on said side of said lip closest to said shank, said camming surface being a flat surface that forms an obtuse angle to said tip surface, wherein when said buckle is in said engaged position, said camming surface makes contact with and cams against said first groove of said base unit, resulting in said rear panel of said base unit to deform and pull inwardly towards said front panel of said bottom base.

9. The process of attaching the cover from the base of a personal computer, comprising:

fitting a cover having a plurality of guide pins extending therefrom onto a base perforated by a corresponding plurality of guide holes, by inserting each of said plurality of guide pins into corresponding ones of said plurality of guide holes;

engaging and securing said cover to said base by rotating a buckle pivotally attached to said cover onto a groove integrally formed with said base unit; and locking said buckle into place by sliding a detent means from an unlocked position to a locked position to prevent said buckle from rotating.

10. The process of claim 9, wherein said buckle rotates to said engaged position to engage with said groove after said cover unit is mounted on said base unit.

11. The process of claim 9, wherein said sliding detent engages said buckle via camming action.

12. The process of opening up a computer case for a personal computer, comprising:

sliding a detent means from a locked position to an unlocked position;

disengaging a buckle formed on a cover unit from a groove formed integrally with a base unit;

rotating said buckle from an engaged position to a disengaged position;

separating said cover unit from said base unit by pulling said cover unit off said base unit.

13. The process of claim 12, wherein said buckle engages with said groove by camming action.

14. The process of claim 12, wherein said sliding detent engages said buckle by camming action.

15. A desktop computer case with an easy assembly structure, comprising:

a base of the computer case for containing internal circuits and a power source;

a cover of the computer case mountable on said base to protect the internal circuits and the power source;

a buckle mounted on a rear portion of said cover, for latching said cover to said base;

a groove positioned in the top rear portion of said base; and a detent mounted on the rear portion of said cover, for securing the buckle after the buckle latches said cover on to the groove of said base.

16. The computer case of claim 15, wherein said buckle engages with said groove by camming action.

17. The computer case of claim 16, further comprising:

a guide pin attached to and extended outwardly from said cover for aligning said cover with said base, when said cover is mounted on said base; and said base having a guide hole formed in the rear portion to receive said guide pin, when said cover is mounted on said base.

18. The computer case of claim 15, wherein said detent secures said buckle by camming action.

19. The computer case of claim 15, wherein said detent is a sliding detent.

20. The computer case of claim 15, wherein said buckle rotates about a pivot to latch said cover to said base.

* * * * *